Nov. 28, 1939.  M. FINIZIO  2,181,847
ROASTING MACHINE
Filed Feb. 5, 1937  6 Sheets-Sheet 1
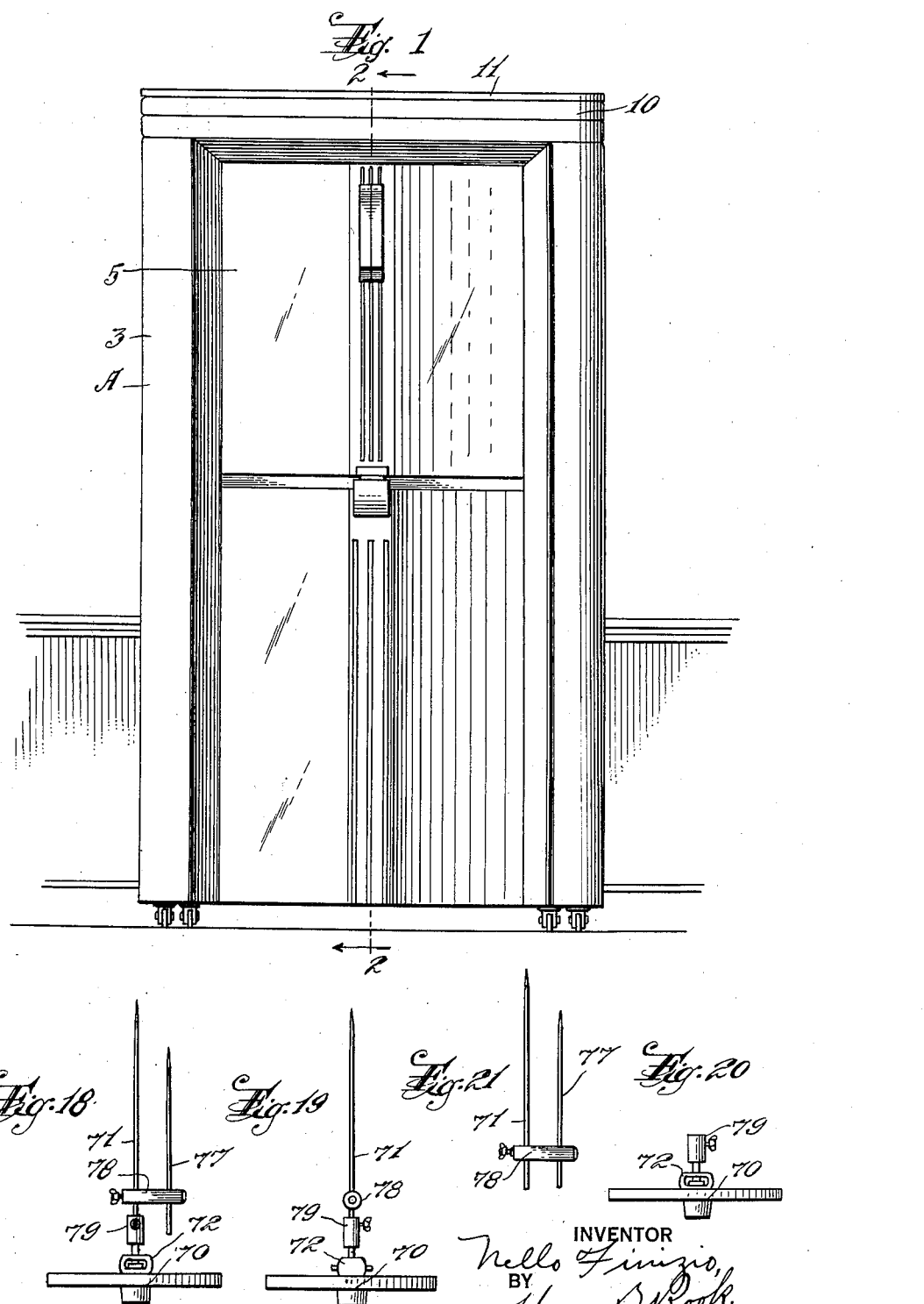
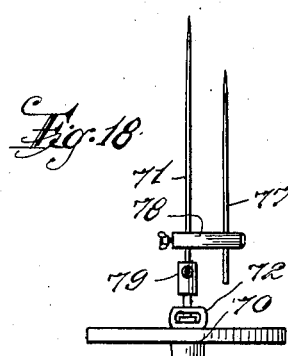
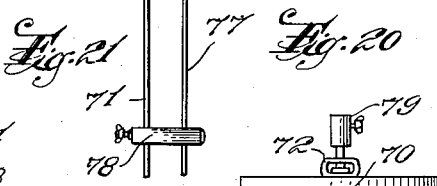
INVENTOR
Nello Finizio,
BY
Harry B. Rook,
ATTORNEY

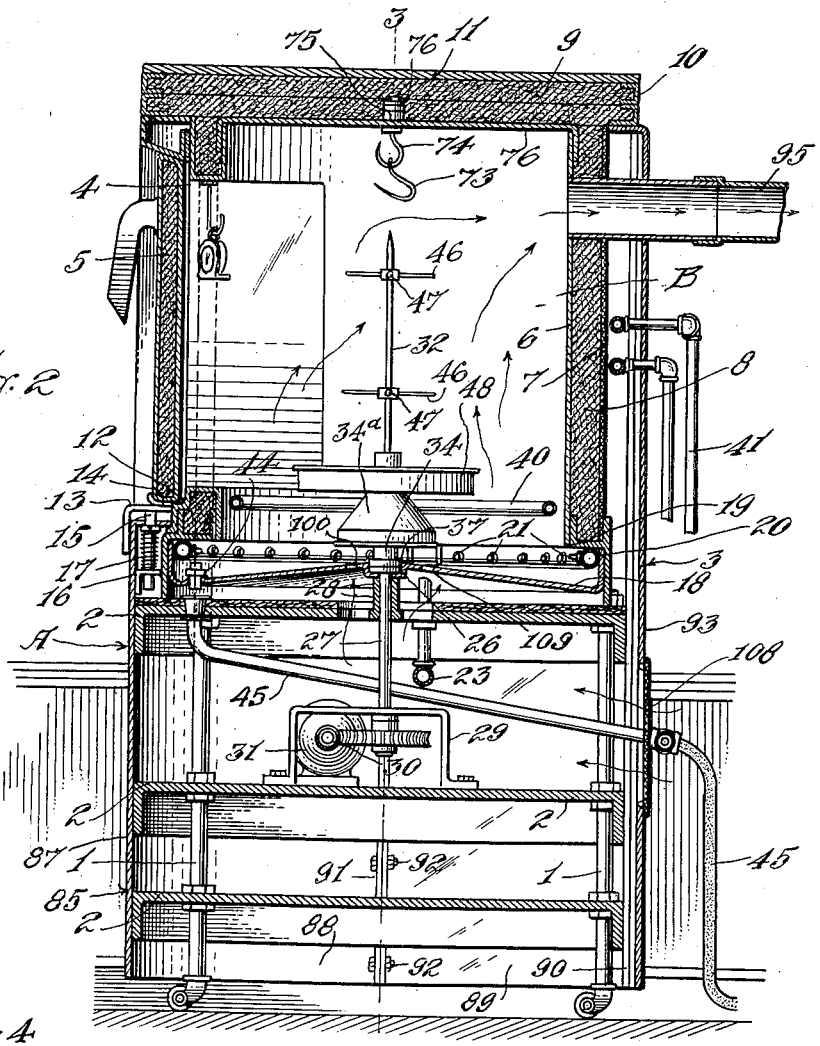

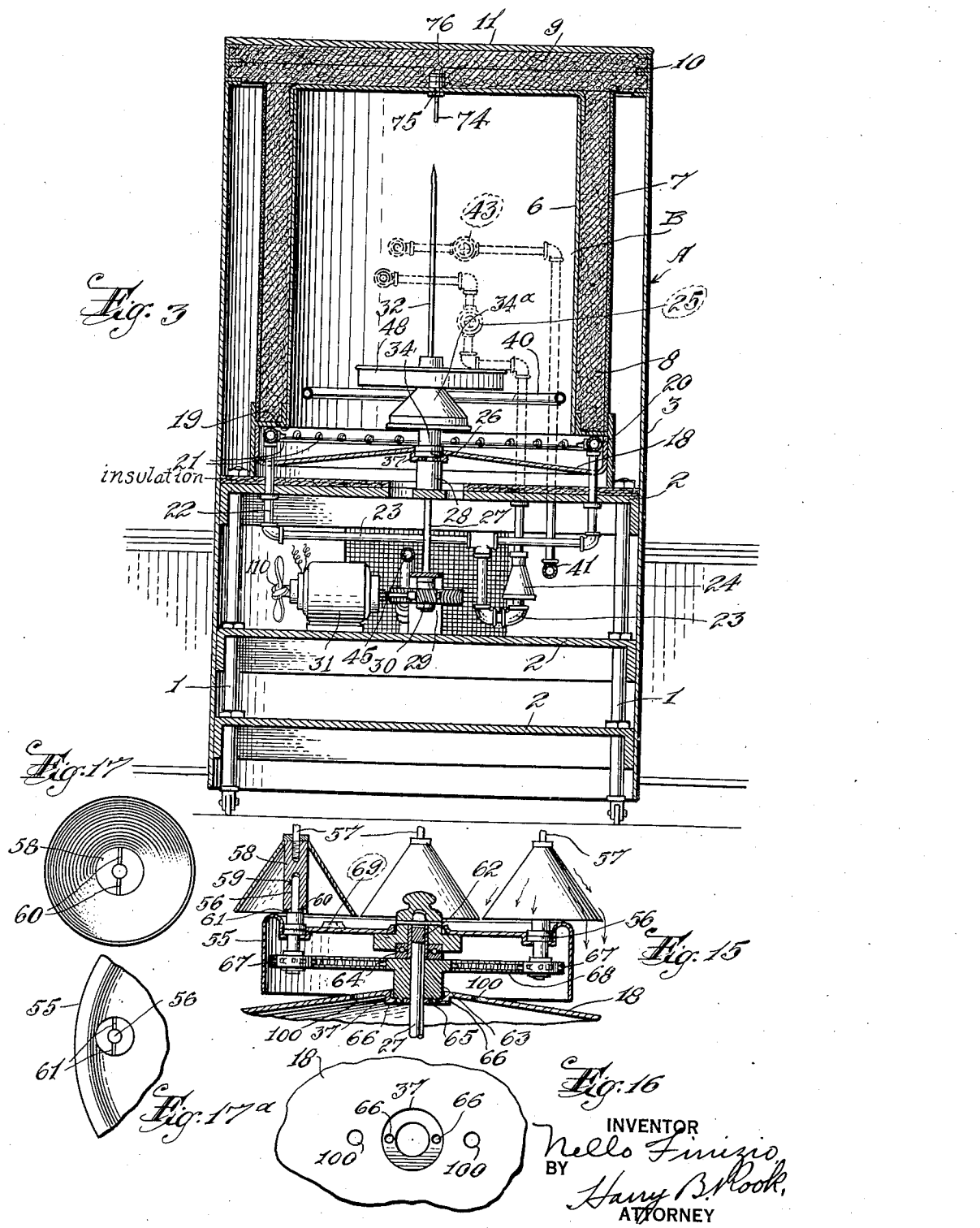

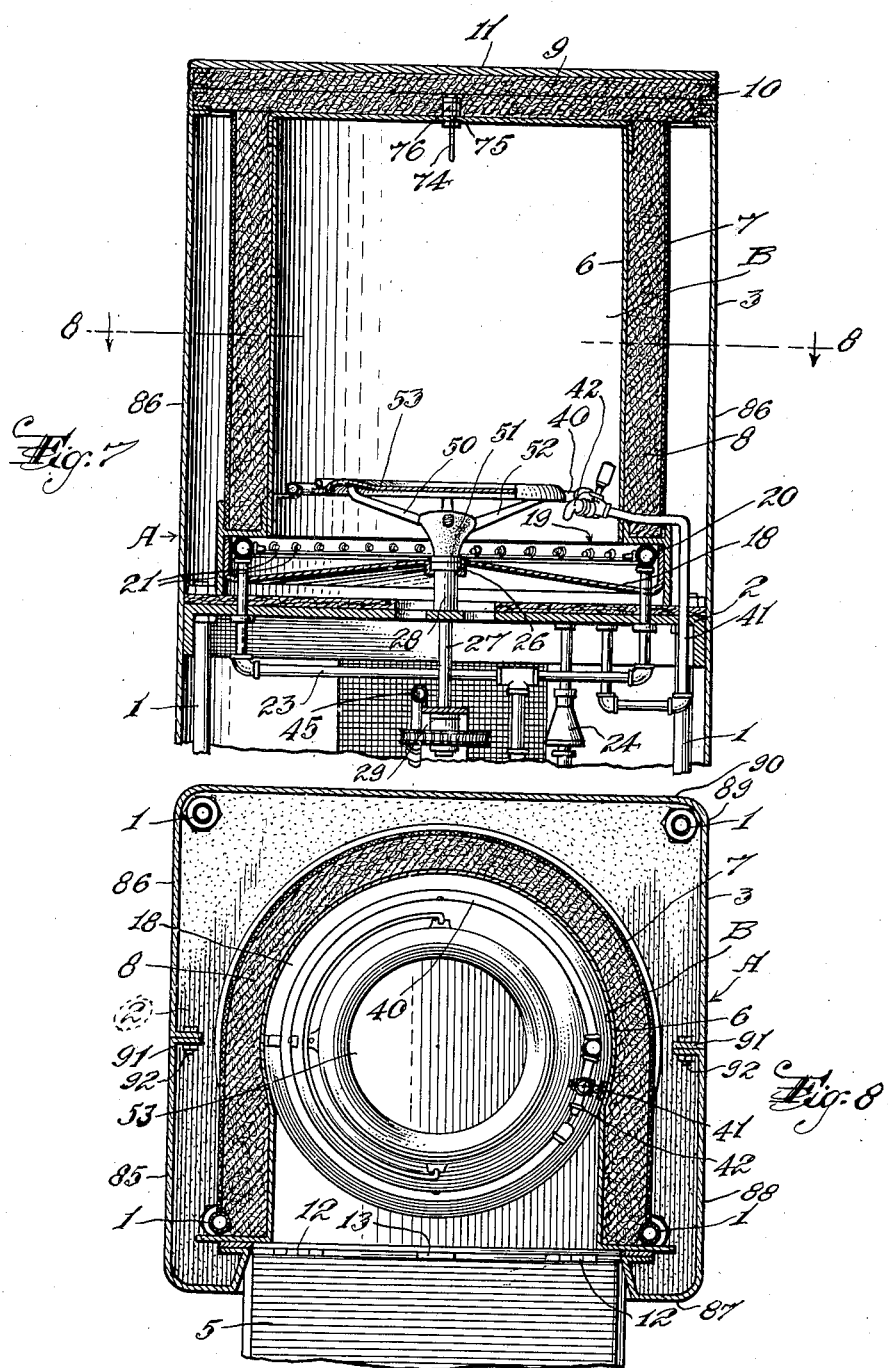

Nov. 28, 1939.        M. FINIZIO        2,181,847
ROASTING MACHINE
Filed Feb. 5, 1937        6 Sheets-Sheet 5
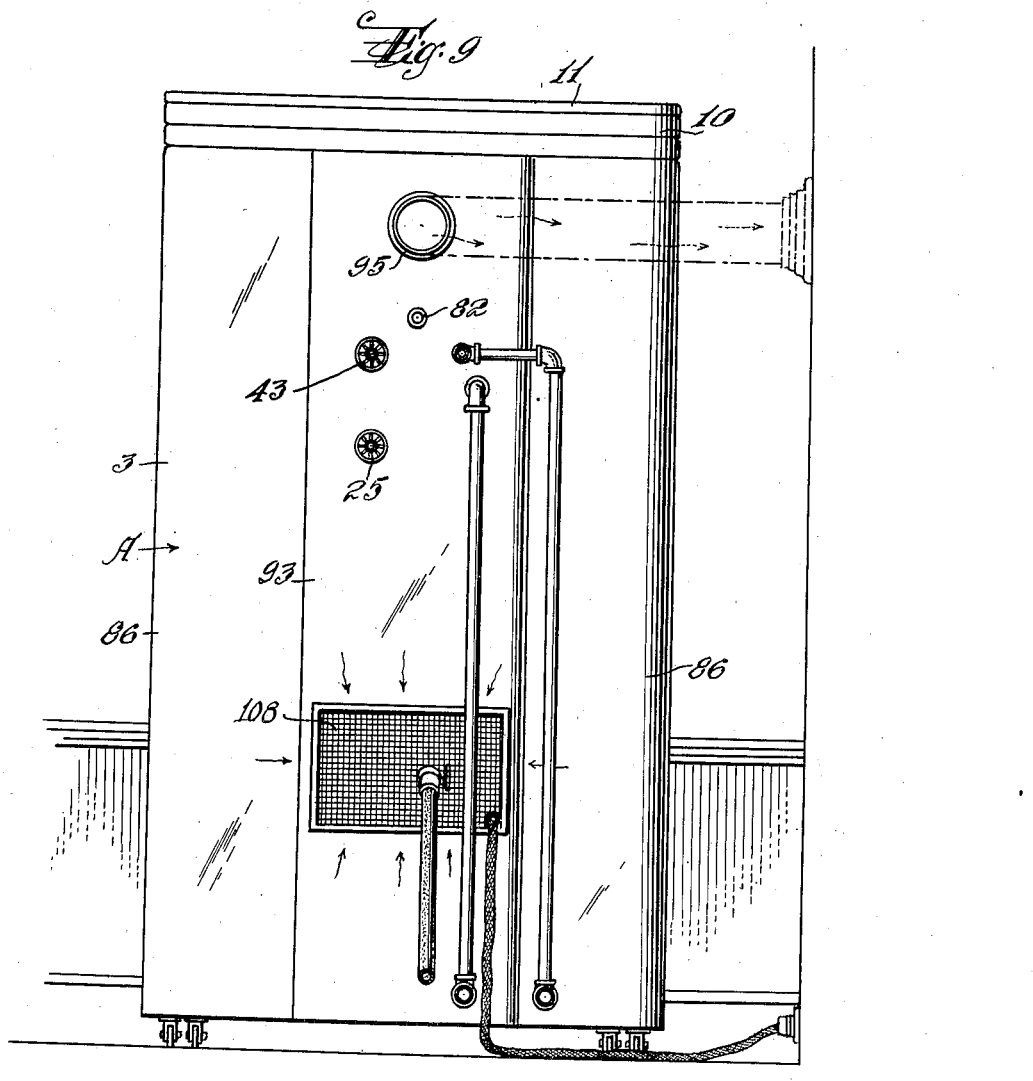
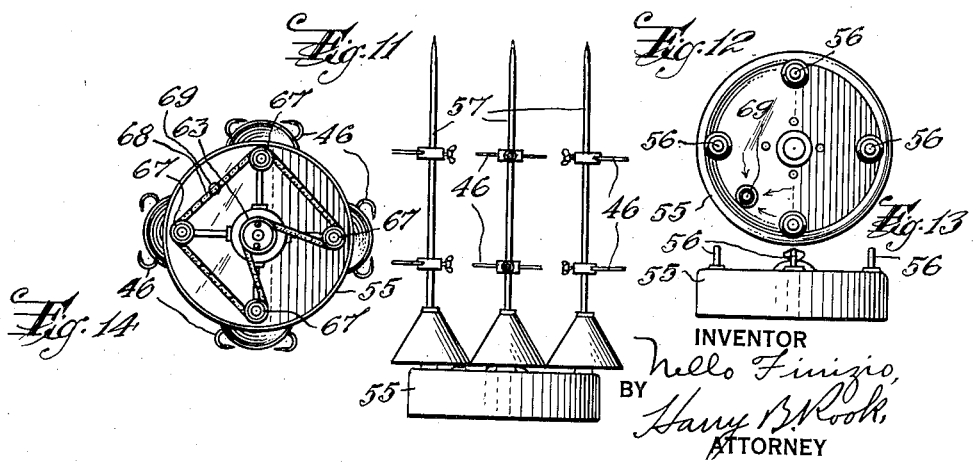
INVENTOR
Nello Finizio,
BY Harry B. Rook,
ATTORNEY Nov. 28, 1939.    M. FINIZIO    2,181,847
ROASTING MACHINE
Filed Feb. 5, 1937    6 Sheets-Sheet 6
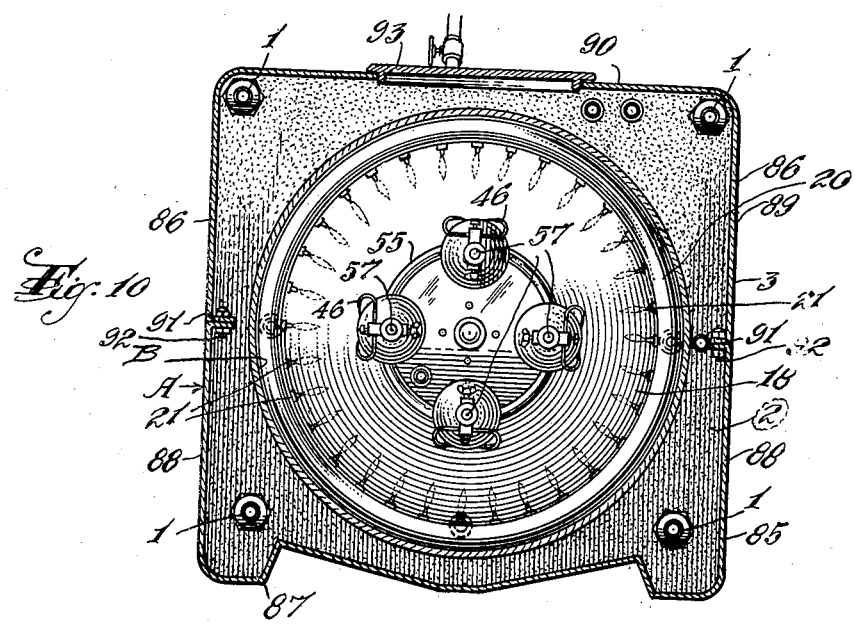
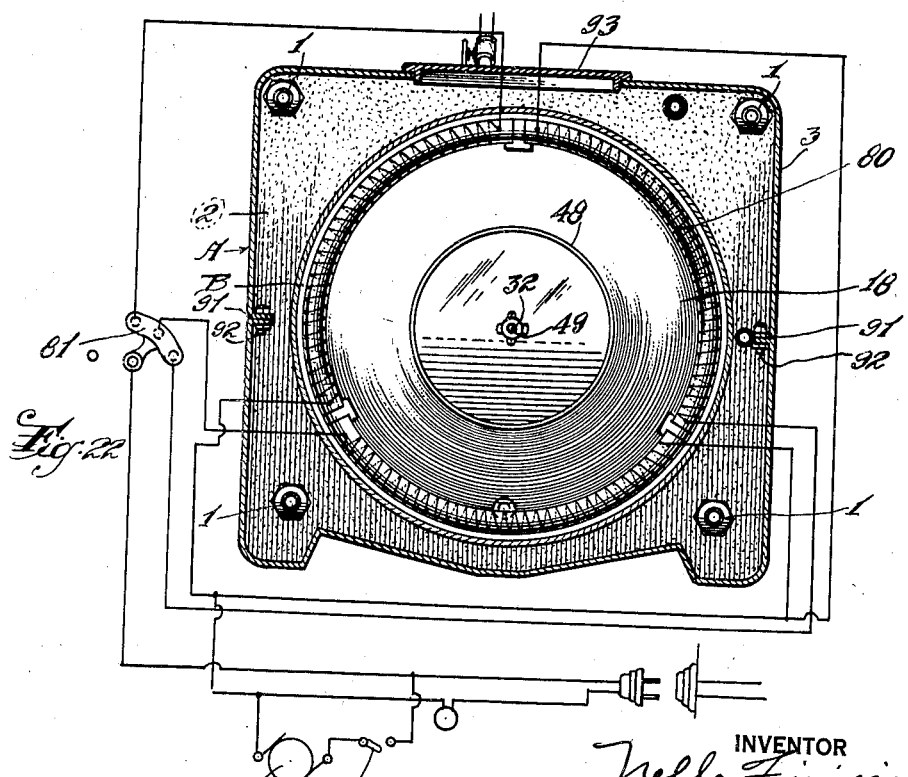
INVENTOR
Nello Finizio
BY
Harry B. Rook,
ATTORNEY Patented Nov. 28, 1939

2,181,847

UNITED STATES PATENT OFFICE 2,181,847

ROASTING MACHINE

Nello Finizio, Peekskill, N. Y.

Application February 5, 1937, Serial No. 124,186

3 Claims. (Cl. 126—41)

This invention relates in general to a machine for roasting, baking and cooking food, one object of the invention being to provide a machine of this character which is susceptible to a wide range of use, for example roasting meats, fowl and baking pies, cakes and vegetables, and which shall be sanitary and economical in the use of fuel.

Another object is to provide a machine of the character described which shall be small and compact so that it may be conveniently used in small spaces and shall be relatively inexpensive.

Another object is to provide such a machine embodying novel and improved features of construction including a roasting chamber and an automatic supply of water thereto for constantly and automatically basting the roasts.

A further object is to provide such a machine embodying novel and improved features of construction including a roasting chamber and means for supplying water thereto whereby the grease from the roast may be collected upon the surface of the water and withdrawn for use, for example in making gravies.

Other objects are to provide in such a machine novel and improved interchangeable attachments to permit of roasting various forms and sizes of pieces of meat and fowl, and for baking pies and cakes and vegetables; to provide a machine having a roasting chamber and a power driven rotary attachment supporting head therein, and a number of attachments which may be interchangeably connected to said head; and to obtain other advantages and results as will be brought out by the following description.

Referring to the accompanying drawings in which corresponding and like parts are designated throughout the several views by the same reference characters Figure 1 is a front elevational view of a machine embodying the invention.

Figure 2 is a vertical sectional view on the line 2—2 of Figure 1, showing one form of food supporting attachment.

Figure 3 is a vertical sectional view on the line 3—3 of Figure 2.

Figure 4 is an enlarged fragmentary vertical sectional view through the attachment supporting head and one of the food supporting attachments.

Figure 5 is a detached perspective view of the food supporting spit shown in Figure 2.

Figure 6 is a detached perspective view of the water supply unit for the roasting chamber.

Figure 7 is a view similar to Figure 3 showing another attachment on the attachment supporting head.

Figure 8 is a horizontal sectional view on the line 8—8 of Figure 7.

Figure 9 is a rear elevation of the machine.

Figure 10 is a view similar to Figure 8 showing another form of roasting attachment and illustrating the gas burner ring.

Figure 11 is a detached side elevation of the roasting attachment shown in Figure 10.

Figure 12 is a top plan view thereof with the food supporting spits removed.

Figure 13 is a side elevation of the attachment as shown in Figure 12.

Figure 14 is a bottom plan view of the attachment.

Figure 15 is an enlarged vertical sectional view through the attachment with portions of the spits broken away.

Figure 16 is a fragmentary plan view of the bottom wall of the roasting chamber.

Figure 17 is a bottom plan view of one of the spits.

Figure 17A is a fragmentary top plan view of one of the spindles for supporting the spit.

Figure 18 is a front elevation of another form of food supporting attachment.

Figure 19 is a side elevation thereof.

Figure 20 is a side elevation of the base portion of the attachment with the food supporting spits removed.

Figure 21 is a front elevation of the spits separated from the base portion, and Figure 22 is a view similar to Figure 10 showing a modification of the invention.

Specifically describing the invention, the machine includes a heat insulated casing A including a frame which is shown as comprising four vertical standards or legs 1 connected by a plurality of transverse struts 2. The legs are preferably formed of pipe sections, but the details of structure of the frame are relatively immaterial. Surrounding the frame is an outer wall 3 which also extends upwardly above the uppermost strut 2, and above said strut 2 which is preferably in the form of a sheet of metal, and within the outer walls 3, is a roasting chamber B that is preferably supported by the legs 1 and uppermost strut 2. The roasting chamber is shown as approximately cylindrical with an opening 4 at one side thereof which is normally closed by a door 5. The roasting chamber has heat insulated walls which as shown include two spaced sheets 6 and 7 of metal between which is disposed a suitable heat insulating material 8. The top of the casing is also heat insulated and spans both the roasting chamber and the outer wall 3, said top being preferably composed of two thicknesses 9 of heat insulating material having metal bound edges 10, and a top metal covering sheet 11.

The door 5 of the roasting chamber is also preferably heat insulated as shown, and is hinged at its lower edge at 12. The door is normally held closed by a follower 13 which is normally influenced against the flat bottom edge 14 of the door by a plunger 15 preferably fixedly connected to the follower and slidably mounted in guides 16 on the inside of the outer wall 3, a spring 17 being provided for normally influencing the follower against the edge of the door. As the door is opened, the follower 13 is pressed against the influence of the spring 17 and when the door is fully opened, the action of gravity on the door overcomes the influence of the spring 17 so that the door will remain open until again manually closed.

The roasting chamber has a bottom wall 18 of approximately conical formation, gradually sloping downwardly from the center toward the outer edges, and the walls of the chamber overhang the bottom wall 18 as at 19.

Beneath the overhanging portion 19 is mounted a gas burner ring 20 having gas outlet nozzle 21 circumferentially spaced along the inner periphery of the ring. The ring is disposed approximately horizontally above the bottom 18 of the roasting chamber and is supplied with gas at diametrically opposite points through branch pipes 22 which are connected to a common supply pipe 23 having an air mixer 24 which is in turn connected through a control valve 25 at the rear of the casing to a gas supply main.

Projecting through the bottom of the roasting chamber at the center thereof is an attachment supporting head 26 which is carried by a vertical shaft 27 journaled in bearings 28 and 29 and driven through worm and worm wheel gearing 30 from a source of power such as an electric motor 31.

The invention contemplates a wide variety of attachments to be interchangeably mounted on the head 26 for accomplishing different roasting, baking or other cooking operations. One form of attachment is shown in Figures 2 and 3 and comprises a spit 32 threaded at one end 33 into a base 34 which has a socket 35 in its bottom to fit over the attachment supporting head 26.

The attachment supporting head constitutes the upper end of the shaft 27 and a ball bearing 36 which is seated in a recess 37 in the bottom wall 18 coaxial with the shaft, the upper extremity of the shaft having a transverse slot 38 which separably receives a transverse pin 39 in the base 34 of the spit. In this way, the spit is caused to rotate with the shaft and the weight of the spit and its contents are supported by the ball bearing 36. Preferably the ball bearing 36 is removable from the end of the shaft for a purpose hereinafter described.

Above the gas burner ring 20 and concentric with the roasting chamber adjacent the attachment supporting head, is an annular water spray pipe 40 water to which is supplied through a pipe 41 from a water main at the rear of the casing. This water spray pipe is shown schematically in Figure 6 and at one extremity has a petcock 42 for permitting water to drip onto the bottom wall 18 of the roasting chamber. The supply of water to the spray pipe is controlled by a main control valve 43 at the rear of the casing.

The bottom wall of the roasting chamber has an overflow nipple 44 which communicates with a drain pipe 45. This overflow pipe is primarily for the purpose of permitting the flow of grease from the surface of the water for collection of the grease for use in gravies and the like.

In use of the machine so far described, the piece of meat or fowl to be roasted is impaled upon the spit 32. Where a fowl is to be roasted, the spit may have one or more U-shaped keepers 46 slidably adjustable on the spit and held in adjusted position by set screws 47, so that the legs of the fowl may be arranged within the keepers to firmly support the fowl on the spit. The gas burner having been lighted in the usual way, the motor 31 is started which causes rotation of the spit and meat or fowl to be roasted.

Where it is desired to automatically baste the roast and provide for collection of grease which drips therefrom, the petcock 42 of the water spray pipe will be opened to permit sufficient water to flow onto the bottom of the roasting chamber, preferably before the burner is lighted. Then, the moisture from the water will automatically baste the roast, and any grease which drips from the roast will float on the surface of the water and eventually flow off through the overflow pipe 44 and drain pipe 45. Preferably the base of the spit will have a conical skirt 34a to drain off the grease away from the ball bearing 37 and shaft 27.

It is also possible to bake vegetables at the same time that the roast is being cooked, and for this purpose I may provide a pan 48 having a coaxial opening 49 to slip over the spit 32 and set upon the base 34 of the spit.

The spit can be quickly removed simply by lifting it from the end of the shaft 27 and may be replaced by another desirable attachment. As shown in Figure 7, I may provide a spider 50 having a hub 51 to fit over the attachment supporting head in the same manner as the base 34 of the spit, the hub having radiating arms 52 for removably supporting a plate 53 upon which may be set, for example, a pie baking pan. The plate 53 may also be used for cooking steaks, chops and the like, and other possible uses will occur to those skilled in the art.

Another form of attachment is shown in Figures 10 to 17 inclusive, which is particularly designed for simultaneously roasting several pieces of meat or fowl. This attachment includes an inverted cup-shaped body 55 in the top of which are journaled rotatable spindles 56 upon each of which may be separably mounted a spit 57. Each spit has a base 58 with a socket 59 to fit over the spindle, and the base is suitably keyed to the spindle as by diametric grooves 60 in the bottom of the base and corresponding ribs 61 on the spindle. Centrally of the body 55 is a recess 62 to fit over the attachment supporting head in the same manner as does the base 34 of the spit 32. A sprocket 63 is arranged coaxially with the recess 62 and has a central opening to receive the shaft 27, preferably a ball bearing 64 being disposed between the sprocket and the top wall of the body 55. In use of this attachment, the ball bearing 36 is removed, and the hub of the sprocket is set into the recess 37. Also, the hub of the socket has pins 65 to fit openings 66 in the bottom of the recess 37 of the bottom wall 18 of the roasting chamber so as to prevent rotation of the sprocket.

Each spindle 56 has a sprocket 67, and a chain 68 passes around these sprockets and the sprockets 63 as shown in Figures 14 and 15, so that upon rotation of the shaft 27, the body 55 will be rotated and simultaneously each of the spits 57 will be rotated.

While using this attachment, the jets of liquid from the liquid spray pipe 40 are directed onto the body 55, as is also the grease from the roasts on the spits. Preferably the top wall of the body 55 has an overflow opening 69 to permit the grease and an excess over a predetermined amount of water, to flow through the opening onto the bottom of the roasting chamber. If desired, the opening 69 may be so located with respect to the chain 68, that the water will drop onto the chain and cool it.

Another form of attachment is shown in Figures 18 to 20 inclusive, and includes a base 70 to fit upon the attachment supporting head as does the spit base 34, said base 70 supporting a spit 71 through a rockable joint 72. This form of the invention is especially useful in the handling of large roasts, the roast being impaled upon the spit 71 and also being supported by a hook 73 separably connected to another hook 74 which is swivel connected at 75 to a plate or spider 76 at the top of the roasting chamber. The rockable point 72 compensates for rotation of the shaft 27 and the changing center of gravity of the roast, and the spit causes the roast to rotate. Preferably the spit will have an auxiliary spit 77 adjustably mounted thereon by a bracket 78 so as to provide a more secure grip on the roast for rotating it. Preferably the spit 71 is separable connected to the rockable joint 72 as by a socket and set screw connection 79 to facilitate handling of the spit and base 70.

Instead of the gas burner I may utilize an electric heater for the roasting chamber as shown in Figure 22. Preferably the electric heater includes three arcuate electric heating coils 80 which together form a complete ring and are located in the same position as the gas burner ring. These arcuate coils 80 are preferably connected in parallel circuit so that one or more selectively may be brought into the circuit as by a selecting switch 81.

Figure 22 also shows the connection of the motor 31 in the circuit, the motor being controlled by a switch 82 in the usual manner.

The casing of the machine may be formed in any suitable manner, but preferably is as shown. The outer wall 3 is shown as composed of a front section 85 and two rear sections 86, the front section having a front panel 87 and two side panels 88 each of which extends over approximately one-half of the side of the casing. Each rear section includes a side panel 89 and a rear panel 90. The side panels 88 and 89 have inturned flanges 91 which are connected by bolts 92, and the edges of the rear panels 90 are in spaced relation to provide access to the parts within the casing. Preferably a separable cover plate 93 closes the opening between the rear panels 90. The front section 85 has an opening registering with the opening in the roasting chamber and in which the door 5 is mounted.

In all forms of the invention, a flue 95 will be provided for venting the roasting chamber, and an air inlet opening 108 will be provided, preferably at the rear of the casing and below the roasting chamber, so as to supply air to the chamber, for example through openings 109 in the bottom wall 18 above the water or grease level which is controlled by the overflow pipe 44. Preferably a fan 110 will be mounted on the shaft of the motor 31 to cause circulation of the air.

While I have shown and described the invention as embodied in certain details of structure, it should be understood that this is primarily for the purpose of illustrating the principles of the invention, and that many modifications and changes may be made in the details of structure without departing from the spirit and scope of the invention.

Having thus described my invention, what I claim is:

1. A machine of the character described comprising a casing having a roasting chamber therein, a heater in said chamber, a food support in said chamber, means for supplying water to the bottom of said chamber to collect grease on the surface of the water, and an overflow opening to drain off the grease at a predetermined level of the water.

2. A machine of the character described comprising a casing having a roasting chamber therein, a heater in said chamber, a head at the bottom of said chamber rotatable about a vertical axis to receive and rotate a food support, a food support including a body mounted on said head to rotate therewith, a stationary sprocket coaxial with said head, a plurality of spindles journaled on said body to rotate on vertical axes relatively to said body, sprockets on said spindles, an endless chain passing around said stationary sprocket and said spindle sprockets to cause rotation of said spindles simultaneously with rotation of said body, means for rotating said head and said body, and food supports mounted on said spindles.

3. A machine of the character described comprising a casing having a roasting chamber therein, a heater in said chamber, a food support in said chamber and disposed centrally thereof, the bottom of said chamber inclining downwardly from said support toward the side walls of the chamber, means for supplying water to the bottom of said chamber to collect grease on the surface of the water, and an overflow opening in the bottom of said chamber adjacent the wall of the latter to drain off the grease at a predetermined level of the water.

NELLO FINIZIO.